(12) United States Patent
Shimizu et al.

(10) Patent No.: US 7,677,128 B2
(45) Date of Patent: Mar. 16, 2010

(54) VEHICULAR SHIFT LOCK DEVICE HAVING PIVOTAL STOPPER AND LINKAGE DEVICES

(75) Inventors: Etsuo Shimizu, Toyota (JP); Yoshifumi Kamei, Okazaki (JP); Takayoshi Masuda, Toyota (JP); Yoshiyuki Shindo, Aichi-ken (JP); Shinichi Uemura, Nagoya (JP); Yasunori Takeuchi, Aichi-ken (JP)

(73) Assignees: Toyota Jidosha Kabushiki Kaisha, Toyota-shi (JP); Mannoh Kogyo Co., Ltd., Anjo-shi (JP); Kabushiki Kaisha Tokai-Rika-Denki-Seisakusho, Niwa-gun (JP); Kojima Press Industry Co., Ltd., Toyota-shi (JP); Tsuda Industries Co., Ltd., Kariya (JP)

( * ) Notice: Subject to any disclaimer, the term of this patent is extended or adjusted under 35 U.S.C. 154(b) by 1208 days.

(21) Appl. No.: 11/207,900

(22) Filed: Aug. 22, 2005

(65) Prior Publication Data
US 2006/0117893 A1   Jun. 8, 2006

(30) Foreign Application Priority Data
Aug. 23, 2004   (JP)   ............................. 2004-242681

(51) Int. Cl.
*G05G 5/00*   (2006.01)
*G05G 5/08*   (2006.01)
(52) U.S. Cl. ............... 74/473.23; 74/473.21; 74/473.26
(58) Field of Classification Search ............. 74/473.21, 74/473.23, 473.24, 473.26; 477/99
See application file for complete search history.

(56) References Cited

U.S. PATENT DOCUMENTS 5,379,871 A * 1/1995 Asano et al. ................. 477/96
5,421,792 A * 6/1995 Kataumi et al. ............... 477/99

(Continued)

FOREIGN PATENT DOCUMENTS

| JP | 8-216722 | 8/1996 |
|----|----------|--------|
| JP | 2002-362179 | 12/2002 |

*Primary Examiner*—Thomas R Hannon
*Assistant Examiner*—Justin Krause
(74) *Attorney, Agent, or Firm*—Oblon, Spivak, McClelland, Maier & Neustadt, L.L.P.

(57) ABSTRACT

A vehicular shift lock device for selectively inhibiting and permitting a movement of a shift lever, including (a) a stopper member pivotable about an axis between a stopping position and a non-stopping position for respectively preventing and permitting a movement of a manually operable member provided to place the shift lock device in its unlocking state, (b) a first biasing member biasing the stopper member toward the stopping position, (c) a first linkage device pivotable about an axis in a first direction by the movement of the manually operable member, (d) a second biasing member biasing the first linkage device in a second direction opposite to the first direction, and (e) a second linkage device pivotable about an axis to its operated position and having a connected state and a disconnected state in which the second linkage device is connected to and disconnected from the stopper member, respectively, and wherein second linkage device is operatively connected to the first linkage device such that the stopper member is pivoted to the non-stopping position when the second linkage device placed in the connected state is pivoted to the operated position by a pivotal movement of the first linkage device in the first direction.

27 Claims, 6 Drawing Sheets

U.S. PATENT DOCUMENTS

| | | | |
|---|---|---|---|
| 5,490,585 A * | 2/1996 | Togano .................. | 477/96 |
| 5,494,141 A * | 2/1996 | Osborn et al. ............ | 192/220.4 |
| 5,662,001 A * | 9/1997 | Smale .................... | 74/483 R |
| 6,298,742 B1 * | 10/2001 | Ey ....................... | 74/473.23 |
| 6,852,065 B2 | 2/2005 | Yamada et al. | |
| 6,991,582 B2 * | 1/2006 | Segeler .................. | 477/99 |

* cited by examiner

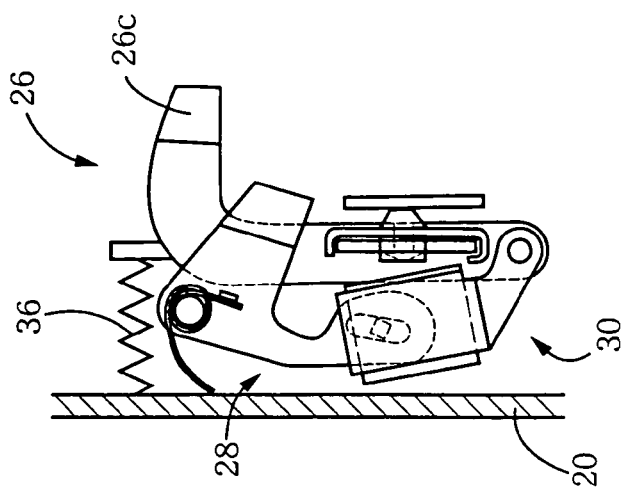
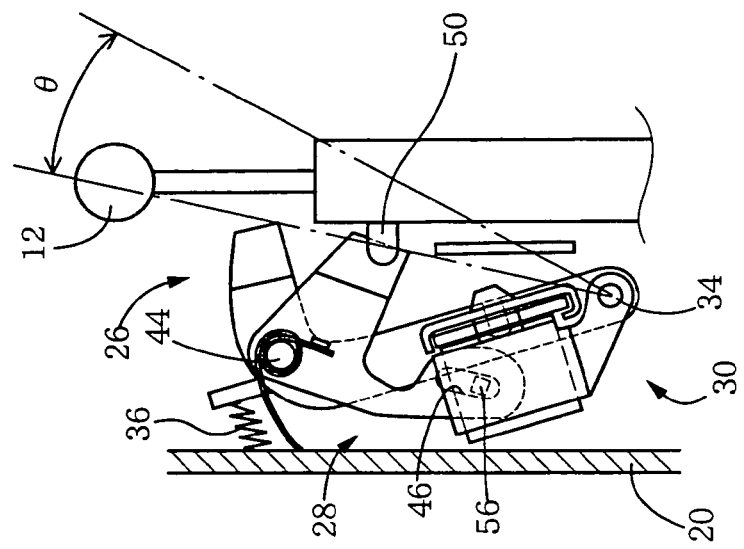
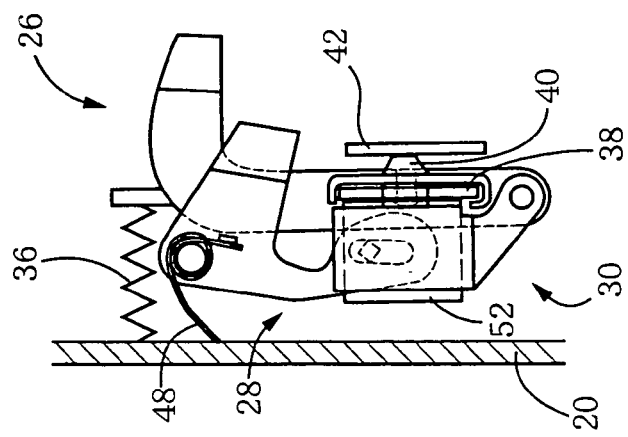

VEHICULAR SHIFT LOCK DEVICE HAVING PIVOTAL STOPPER AND LINKAGE DEVICES

BACKGROUND OF THE INVENTION

1. Field of the Invention

The present invention relates to a shift lock device operable between its locking and unlocking states for inhibiting and permitting a shifting movement of a shift lever provided in a vehicle such as an automobile.

2. Discussion of Related Art

In the field of automotive vehicles provided with an automatic transmission, there is known a shift lock device having a locking state for locking a shift lever in its parking position. In this locking state, the shift lever is prevented from being operated from the parking position to any other operating position unless a brake pedal is in its operated position. An example of this vehicular shift lock device is disclosed in JP-8-216722A.

The shift lock device disclosed in the above-identified publication is arranged to be placed in its unlocking position when a detent knob provided on the shift lever is operated. This shift lock device includes: a lock plate movable by a depressing operation of the detent knob; a cam member which has a cam surface and which is movable when the cam surface is pushed by the lock plate; a stopper member biased by a spring toward its stopping position for preventing a movement of the lock plate; and a solenoid-operated device operable to connect the stopper member and the cam member to each other. When the detent knob is depressed, the lock plate is linearly movable downwards while pushing the cam surface of the cam member, whereby the cam member is linearly laterally movable. When a solenoid of the solenoid device is in its energized state, the stopper member is laterally moved with the cam member, so that the lock plate can be moved downwards to its unlocking position. When the solenoid is in its de-energized state, on the other hand, only the cam member is laterally moved while the stopper member remains in its stopping position in which the downward movement of the lock plate is prevented by the stopper member, so that the lock plate is held in its locking position.

There is also known a gate-type shift lever which is not provided with a detent knob and which is capable of functioning as the detent knob, so that this gate-type shift lever has an improved ease of operation or use. Namely, this shift lever functions as a manually operable unlocking member to place a shift lock device in its unlocking position when the shift lever is operated (pivoted) laterally of the vehicle. To place the shift lock device in the unlocking position, the shift lever is operated laterally from its parking position. The shift lock device used with the gate-type shift lever includes a stopper member which is movable between its stopping position for preventing a lateral movement of the shift lever from its parking position, and its non-stopping for permitting the lateral movement. In this shift lock device, the stopper member, cam member, etc. are arranged to be linearly movable.

For easy operation of the manually operable member operated to place the shift lock device to its unlocking position, the operating stroke of the manually operable member is desirably short. In the shift lock device wherein the lock plate, cam member and stopper member are all linearly moved, it is difficult to sufficiently amplify the operating stroke of the manually operable member into the linear movements, although some degree of amplification of the operating stoke is possible by determining an angle of inclination of the cam surface of the cam member so as to amplify the operating stroke. Accordingly, the required operating stroke of the manually operable member tends to be large. This is contrary to the desirability of reducing the required operating stroke of the manually operable member.

SUMMARY OF THE INVENTION

The present invention was made in the light of the background art discussed above. It is therefore an object of the present invention to provide a vehicular shift lock device which permits reduction of the required operating stroke of the manually operable member.

The object indicated above may be achieved according to the principle of the present invention, which provides a vehicular shift lock device operable between a locking state for inhibiting a movement of a shift lever and an unlocking state for permitting the movement of the shift lever, the vehicular shift lock device comprising: a stopper member pivotable about an axis between a stopping position thereof for preventing a movement of a manually operable member operable to place the shift lock device in the unlocking state, and a non-stopping position thereof for permitting the movement of the manually operable member; a first biasing member which biases the stopper member toward the stopping position; a first linkage device pivotable about an axis in a first direction by the movement of the manually operable member to place the shift lock device in the unlocking position; a second biasing member which biases the first linkage device so as to be pivoted in a second direction opposite to the first direction; and a second linkage device pivotable about an axis to an operated position thereof and having a connected state and a disconnected state in which the second linkage device is connected to and disconnected from the stopper member, respectively, and wherein the second linkage device is operatively connected to the first linkage device such that the stopper member is pivotally moved to the non-stopping position when the second linkage device placed in the connected state is pivoted to the operated position by a pivotal movement of the first linkage device in the first direction by the movement of the manually operable member.

In the vehicular shift lock device of the present invention constructed as described above, the first linkage device is pivoted in the first direction by a movement of the manually operable member to place the shift lock device in the unlocking state, and the second linkage device is pivoted to its operated position by the pivotal movement of the first linkage device. When the second linkage device is placed in its connected state in which the second linkage device is connected to the stopper member, the stopper member is pivoted to the non-stopping position, so that the shift lock device is placed in the unlocking position. Thus, all of the stopper member and the first and second linkage devices are pivotally moved rather than linearly moved when the manually operable member is moved to place the shift lock device in the unlocking state, the operating stroke of the manually operable member is easily amplified into relatively large amounts of pivotal movements of those stopper member and linkage devices, whereby the required operating stroke of the manually operable member can be reduced.

In a first preferred form of the present invention, the manually operable member is the shift lever having a parking position, and the stopper member prevents a movement of the shift lever from the parking position when the stopper member is placed in the stopping position, and permits the movement of the shift lever when the stopper member is placed in the non-stopping position.

In a second preferred form of the invention, the stopper member is pivotable about the axis about which the second linkage device is pivotable to its operated position.

In a third preferred form of the invention, the shift lock device further comprises a stationary stopper plate, and the stopper plate is normally held in abutting contact with the stationary member under a biasing action of the first biasing member, whereby the stopper plate is normally held in the stopping position.

In a fourth preferred form of this invention, the first linkage device has a cam surface which is engageable with the manually operable member during the movement to place the shift lock device in the unlocking state, whereby the first linkage device is pivoted in the first direction by the movement of the manually operable member.

In a fifth preferred form of this invention, the first linkage device further has an elongate hole, and the second linkage device has a pin engaging the elongate hole, and is pivotable to the operated position through engagement of the pin with the elongate hole when the first linkage device is pivoted in the first direction.

In a sixth preferred form of this invention, at least one of the stopper member and the second linkage device has an electrically controlled actuator operable to selectively establish the connected and disconnected states of the second linkage device.

In one advantageous arrangement of the sixth preferred form of the invention, one of the stopper member and the second linkage device has a yoke fixed thereto, and the other of the stopper member and the second linkage device includes a solenoid energized to attract said yoke, with the electrically controlled actuator including the yoke and the solenoid. Preferably, the stopper member has the yoke fixed thereto, and the second linkage device includes the solenoid.

In another advantageous arrangement of the sixth preferred form of the invention, one of the stopper member and the second linkage device has an engaging hole, and the other of the stopper member and the second linkage device includes an engaging pin engageable with the engaging hole, and the above-indicated actuator is energized to move the engaging pin into the engaging hole. Preferably, the stopper member has the engaging hole, and the second linkage device includes the engaging pin and the actuator. For example, the actuator establishes the connected state of the second linkage device when a brake pedal provided on a vehicle provided with the shift lock device is in operation.

The first biasing member may be a compression coil spring, or a torsion spring, and the second biasing member may be a torsion spring.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 3A, 3B and 3C are elevational views taken in the direction of arrow 3 in FIG. 1, FIG. 3A showing an initial state of the shift lock device, and FIG. 3B showing an unlocked state of the shift lock device, while FIG. 3C showing a locked state of the shift lock device;

DESCRIPTION OF THE PREFERRED EMBODIMENTS

Figure 1:
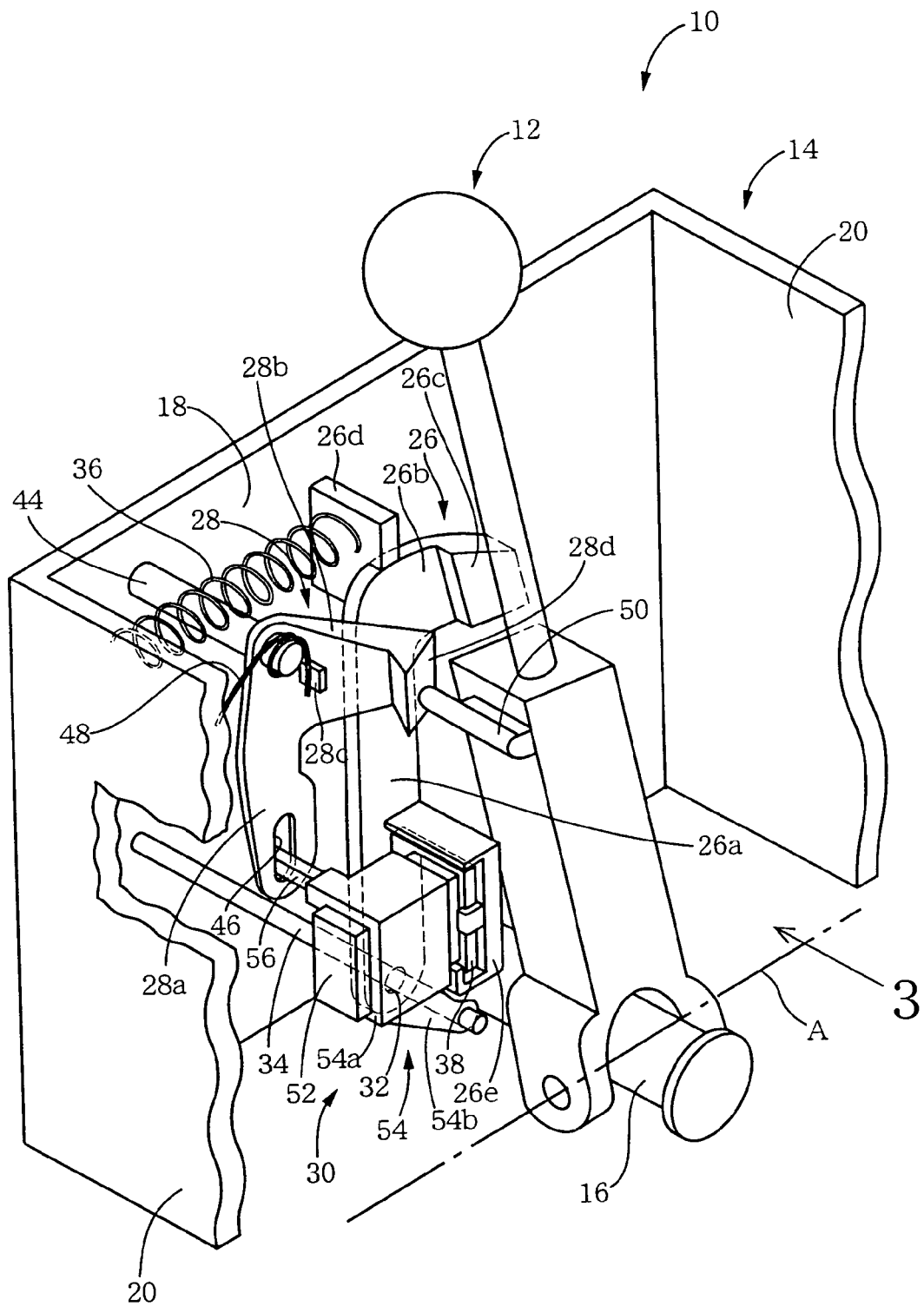
FIG. 1 is a perspective view schematically showing a construction of a vehicular shift lock device according to one embodiment of this invention.

Referring first to the perspective view of FIG. 1, there is schematically shown the construction of a vehicular shift lock device 10 constructed according to a first embodiment of this invention. The shift lock device 10 is operable between a locking state for inhibiting a movement of a shift lever 12 and an unlocking state for permitting the movement of the shift lever 12. As shown in FIG. 1, the shift lock device 10 has a casing 14 by which a transversal shaft 16 is supported. The transversal shaft 16 extends in the transversal or lateral direction of an automotive vehicle provided with an automatic transmission (not shown) a shifting action of which is controlled by the shift lever 12. The shift lever 12 is pivotable about the transversal shaft 16, and a longitudinal shaft (not shown) which has an axis A perpendicular to the axis of the transversal shaft 16 and extends in the longitudinal or running direction of the vehicle.

The casing 14 has a pair of parallel longitudinal walls 18 (one of which is shown in FIG. 1) which are parallel to the longitudinal direction of the vehicle, and a pair of parallel transversal walls 20 which are parallel to the transversal direction of the vehicle. The casing 14 further has upper and lower walls (not shown) perpendicular to the longitudinal and transversal walls 18, 20. The shift lock device 10 is accommodated in this casing 14.

Figure 2:
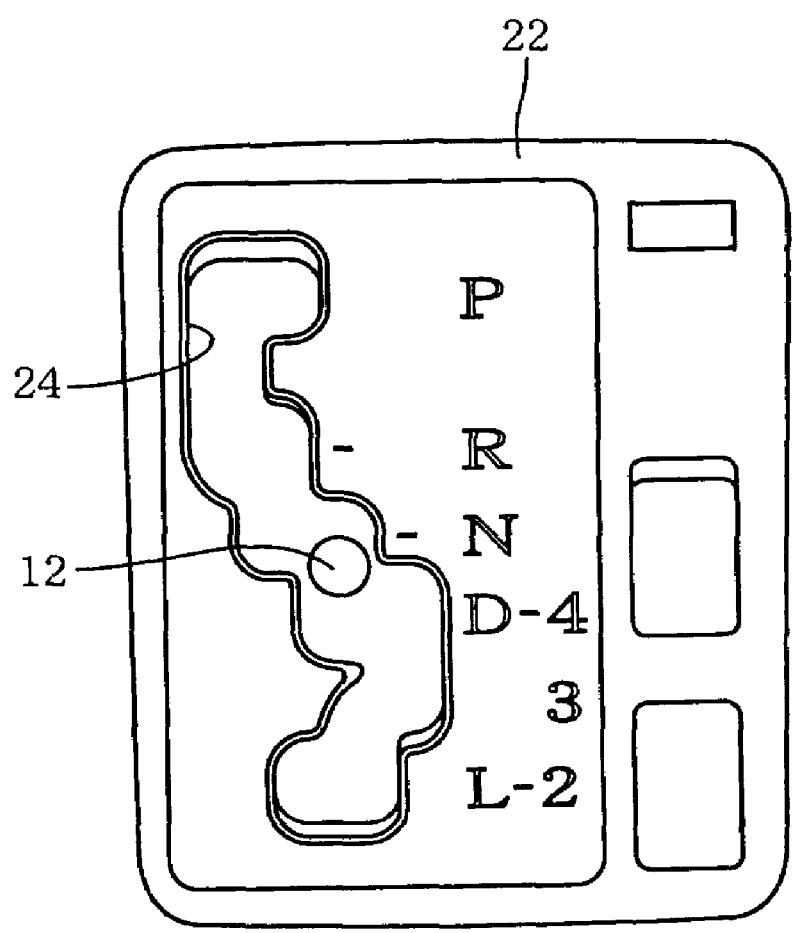
FIG. 2 is a view showing an example of a covering of a shifting device provided in a driver's compartment of a vehicle.

Referring to FIG. 2 showing an example of a covering 22 of a shifting device which is disposed in a compartment of the vehicle and which includes the shift lever 12. The shifting device is of a gate type wherein the shift lever 12 per se also functions as a manually operable member operable to place the shift lock device 10 in its unlocking state. As shown in FIG. 2, the covering 22 has a guide slot 24 along which the shift lever 12 is pivotally movable when the shift lock device 10 is in the unlocking state. Namely, the guide slot 24 indicates a shifting pattern of the shift lever 12. The above-indicated upper wall (not shown) of the casing 14 of the shift lock device 10 has a guide slot identical in shape with the guide slot 24, and a stem portion of the shift lever 12 is guided along this guide slot of the casing 14, when the shift lever 12 is operated to a selected one of a plurality of positions P, R, N, D-4, 3 and L-2 as indicated in FIG. 2 by way of example, for thereby controlling the shifting action of the automatic transmission, so that a selected one of gear positions of the automatic transmission is established. To operate the shift lever 12 from the parking position P to any of the other operating positions, the shift lever 12 functioning as the above-described manually operable member to place the shift lock device 10 in its unlocking position must be first pivoted about the axis A from the parking position P in the lateral direction toward one of the longitudinal walls 18.

The shift lock device 10 is operable between the locking state for inhibiting the pivotal movement of the shift lever 12 about the axis A and a further movement of the shift lever 12, and the unlocking state for permitting this pivotal movement and the further movement of the shift lever 12. As described below, the locking state is established when a brake pedal is not in operation upon the pivotal movement of the shift lever 12 from its parking position P, and the unlocking state is established when the brake pedal is in operation upon the pivotal movement from the parking position P. The shift lock device 10 includes a stopper member in the form of a stopper link 26, a first linkage device in the form of a cam link 28, and a second linkage device in the form of a solenoid link 30.

The stopper link 26 is a generally L-shaped planar member including a long plate portion 26a and a short plate portion 26b extending perpendicularly from one of opposite longitudinal ends of the long plate portion 26a. The long plate portion 26a has a through-hole 32 formed through an end portion having the other longitudinal end. The pair of longitudinal walls 18 support a first support shaft 34 such that the first support shaft 34 extends in the transversal direction, that is, perpendicularly to the longitudinal walls 18, and is located between the transversal shaft 16 and the rear one of the transversal walls 20. This first support shaft 34 extends through the through-hole 32, so that the stopper link 26 is supported by the first support shaft 34 pivotally about the axis of the first support shaft 34. The short plate portion 26b has a proximal part on the side of the long plate portion 26a, and a distal part which is remote from the long plate portion 26a and which has a large thickness. The distal part has a stopper surface 26c for abutting contact with the stem portion of the shift lever 12 when the stopper link 26 is placed in its stopping position of FIG. 1 which will be described.

The stopper link 26 further has a spring-seat portion 26d formed on one of its opposite surfaces which is on the side of the left one of the longitudinal walls 18. The spring-seat portion 26d is located at the proximal end of the short plate portion 26b, namely, at the upper end of the long plate portion 26a, and extends in the vertical direction and in parallel with the transversal walls 20. A first biasing member in the form of a compression coil return spring 36 is fixedly interposed between the rear transversal wall 20 and one of opposite surfaces of the spring-seat portion 26d which is opposed to the rear transversal wall 20 (which is remote from the short plate portion 26b). The long plate portion 26a has a bracket portion 26e formed on a front part of its lower end portion having the through-hole 32 such that bracket portion 26e is parallel to the first support shaft 34. This bracket portion 26e holds a yoke 38 in the form of an iron plate.

As shown in FIGS. 3A, 3B and 3C, the bracket portion 26e further holds a rubber cushion 40 such that the rubber cushion 40 protrudes at its front end portion from the front end of the bracket portion 26e, away from the yoke 38. The stopper link 26 is normally held in its stopping position of FIG. 1 and FIGS. 3A and 3C under a biasing action of the return spring 36, with the rubber cushion 40 held in abutting contact at its front end surface with a stopper plate 42, as shown in FIGS. 3A and 3C. The stopper plate 42 is supported by the longitudinal walls 18 of the casing 14 such that the stopper plate 42 is perpendicular to the longitudinal walls 18. That is, the stopping position of the stopper link 26 in which the pivotal movement of the shift lever 12 about the axis A from the parking position P in the lateral or transversal direction of the vehicle is prevented by the abutting contact of the shift lever 12 with the stopper surface 26c is defined by abutting contact of the rubber cushion 40 with the stopper plate 42, which is normally maintained by a biasing force of the return spring 36 biasing the stopper link 26 in a clockwise direction as seen in FIG. 1.

Referring back to FIG. 1, the cam link 28 includes a vertical plate portion 28a extending in the vertical direction, and a horizontal plate portion 28b and which extends from an upper end part of the vertical plate portion 28a in the horizontal direction and which has a thickness that increases as it extends toward the front transversal wall 20. A second support shaft 44 supported by the left longitudinal wall 18 extends through the upper end part of the vertical plate portion 28a in the lateral direction and in parallel to the second support shaft 34 described above. The cam link 28 is pivotable about a second axis in the form of the second support shaft 44, while the stopper link 26 and the solenoid link 30 are pivotable about a first axis in the form of the first support shaft 34. The vertical portion 28a has an elongate hole 46 formed therethrough so as to extend in the vertical direction. The solenoid link 30 carries a pin 56 extending through the elongate hole 46. The vertical portion 28a further has a protrusion 28c formed at its upper end part. A second biasing member in the form of a torsion spring 48 is wound on the second support shaft 44 at a position near the cam link 28. The torsion spring 48 is held in engagement at one of its opposite ends with the protrusion and at the other end with the inner surface of the rear transversal wall 20. The cam link 28 is biased by the torsion spring 48 in a counterclockwise direction as seen in FIG. 1, and is normally held in its original position of FIG. 1 under a biasing action of the torsion spring 48.

The horizontal plate portion 28b has a cam surface 28d formed on its distal end remote from the vertical plate portion 28a. The cam surface 28d is inclined such that a distance between the cam surface 28d and the right longitudinal wall 18 in the transversal direction of the vehicle increases as the cam surface 28d extends toward the front transversal wall 20 in the longitudinal direction of the vehicle, that is, such that the distance between the cam surface 28d and the left longitudinal wall 18 decreases as the cam surface 28d extends toward the front transversal wall 20. The shift lever 12 is provided with a pusher pin 50 which comes into abutting contact with the inclined cam surface 28d when the shift lever 12 is pivoted about the axis A from its parking position P toward the left longitudinal wall 18, namely, toward the stopper link 26 and cam link 28. The pusher pin 50 is positioned relative to the cam link 28 placed in the original position of FIG. 1 such that the pusher pin 50 initially contacts an area of the cam surface 38d which is lower than the axis of the second support shaft 44. When the pusher pin 50 is brought into abutting contact with the cam surface 28d during the pivotal movement of the shift lever 12 toward the left longitudinal wall 18, the cam link 28 is pivoted about the second axis in the form of the second support shaft 44 in a clockwise direction from the original position to an operated position against the biasing force of the torsion spring 48, as described below in detail by reference to FIG. 3B. The clockwise pivotal motion of the cam link 28 causes its vertical plate portion 28a to move toward the rear transversal wall 20.

The solenoid link 30 described above includes a solenoid 52 and a holder casing 54 holding the solenoid 52. The holder casing 54 includes a holder portion 54a of box construction, and a leg portion 54b extending from the lower wall of the holder portion 54a. The first support shaft 34 described above extends through the leg portion 54b, such that the solenoid link 30 as well as the stopper link 26 is pivotable about the first axis in the form of the first support shaft 34.

The pin 56 described above extends from one end portion of an upper wall of the holder portion 30a of the solenoid link 30, which one end portion is remote from the yoke 38 of the stopper link 26. The pin 56 is held in engagement with the elongate hole 46 formed in the cam link 28. In this arrangement, the solenoid link 30 is pivotable in the counterclockwise direction about the first axis (axis of the first support shaft 34) to an operated position of FIGS. 3B and 3C when the cam link 28 is pivoted in the clockwise direction about the first axis to its operated position. The holder casing 54 holds the solenoid 52 such that an end portion of the solenoid 52 on the side of the yoke 38 extends from the holder portion 54a toward the yoke 38. When the solenoid 52 is energized, the yoke 38 is attracted to the solenoid 52, whereby the stopper link 26 having the yoke 38 is pivotable about the first support shaft 34 (first axis) together with the solenoid link 30.

Referring to the elevational views of FIGS. 3A, 3B and 3C, there will be described an operation of the present shift lock device 10. FIG. 3A shows an initial state of the shift lock device 10 when the shift lever 12 is placed in the parking position P, and FIG. 3B shows the unlocking state of the shift lock device 10 in which the stopper link 26 is placed in the non-stopping position as a result of the pivotal movements of the cam link 28 and the solenoid link 30 to their operated position by the pivotal movement of the shift lever 12 from its parking position P. FIG. 3C shows the locking state of the shift lock device 10 in which the stopper link 26 remains in the stopping position even with the pivotal movements of the cam and solenoid links 28, 30 to their operated position.

In the initial state of the shift lock device 10 shown in FIG. 3A, the pusher pin 50 provided on the shift lever 12 is spaced apart from the cam surface 28d of the cam link 28, and the stopper link 26 is held in its stopping position under the biasing force of the return spring 36, while the rubber cushion 40 fixed on the stopper link 26 is held in abutting contact with the stationary stopper plate 42. In this initial state, the cam link 28 and the solenoid link 30 operatively connected to the cam link 28 are held in their original position under the biasing force of the torsion spring 48. In the original position, the solenoid 52 of the solenoid link 30 is held in contact with the yoke 38 of the stopper link 26.

When the shift lever 12 is pivoted about the axis A from its parking position P in the transversal or lateral direction of the vehicle to place the shift lock device 10 in the unlocking state for permitting a further movement of the shift lever 12 to any other position (R, N, D-4, 3, L-2), the pusher pin 50 is brought into abutting contact with the cam surface 28d of the cam link 28, so that the cam link 28 is pivoted about the second axis (axis of the second support shaft 44) in the clockwise direction as seen in FIG. 3B. Since the pin 56 of the solenoid link 30 is held in engagement with the elongate hole 46 of the cam link 28, the clockwise pivotal movement of the cam link 28 causes a counterclockwise pivotal movement of the solenoid link 30 about the first axis (axis of the first support shaft 34) in the counterclockwise direction as seen in FIG. 3B.

If the solenoid 52 is in the energized state when the solenoid link 30 is pivoted counterclockwise with the clockwise pivotal movement of the cam link 38 about the first support shaft 34, the yoke 38 is attracted to the solenoid 52, 50 that the stopper link 26 is pivoted counterclockwise about the first support shaft 34 with the solenoid link 30, against the biasing force of the return spring 36, as also shown in FIG. 3B. Namely, the stopper link 26 is pivoted to its non-stopping position by the lateral pivotal movement of the shift lever 12 from the parking position P when the solenoid 52 is in the energized state. The solenoid 52 is in the energized state while the brake pedal of the vehicle is in an operated or depressed state. An angle "θ" (indicated in FIG. 3B) of pivotal movement of the stopper link 28 by the lateral pivotal movement of the shift lever 12 (by the clockwise pivotal movement of the cam link 28 and counterclockwise pivotal movement of the solenoid link 30) is determined to permit the stopper link 26 to be brought into its predetermined non-stopping position in which a further lateral pivotal movement of the shift lever 12 is permitted, with the stopper surface 26c spaced from a path of pivotal movement of the shift lever 12. It is noted that the magnetic force of attraction generated by the solenoid 52 is determined to be larger than the biasing force of the return spring 36, to prevent the yoke 38 from being separated from the solenoid 52 when the solenoid link 30 is pivoted counterclockwise about the first support shaft 34.

If the solenoid 52 is in the de-energized state upon counterclockwise pivotal movement of the solenoid link 30, the stopper link 26 remains in the stopping position, as shown in FIG. 3C, so that the shift lever 12 comes into abutting contact with the stopper surface 26c of the stopper link 26, whereby a further lateral pivotal movement of the shift lever 12 is prevented by the stopper surface 26c. The shift lever 12 may come into abutting contact with the stopper surface 26c shortly before the pusher pin 50 comes into contact with the cam surface 28d, that is, shortly before initiation of the pivotal movements of the cam link 28 and solenoid link 30, depending upon a relationship between a distance between the shift lever 12 and the stopper surface 26c and a distance between the pusher pin 50 and the cam surface 28d.

In the shift lock device 10 constructed as described above, the pivotal movement of the shift lever 12 to place the shift lock device 10 in the unlocking state, the cam link 28 is pivoted by the pivotal movement of the shift lever 12, and the solenoid link 30 is pivoted by the pivotal movement of the cam link 28. If the stopper link 26 is connected to the solenoid link 30, the stopper link 26 is pivoted to its non-stopping position by the pivotal movement of the solenoid link 30, so that the shift lock device 10 is brought into its unlocking state. Thus, the stopper link 26, cam link 28 and solenoid link 30 which are moved by the lateral pivotal movement of the shift lever 12 to place the shift lock device 10 in the unlocking state are all arranged to be pivotally moved rather than linearly moved, making it possible to easily amplify the operating stroke of the shift lever 12, thereby reducing the required operating stroke of the shift lever 12.

In addition, the stopper link 26, cam link 28 and solenoid link 30 which are moved by the lateral pivotal movement of the shift lever 12 to place the shift lock device 10 in the unlocking state and which are all arranged to be pivotally moved have a smaller sliding resistance than where those links were arranged to be linearly moved, so that the links 26, 28, 30 are operable with a high degree of stability even at a low ambient temperature.

Figure 4:
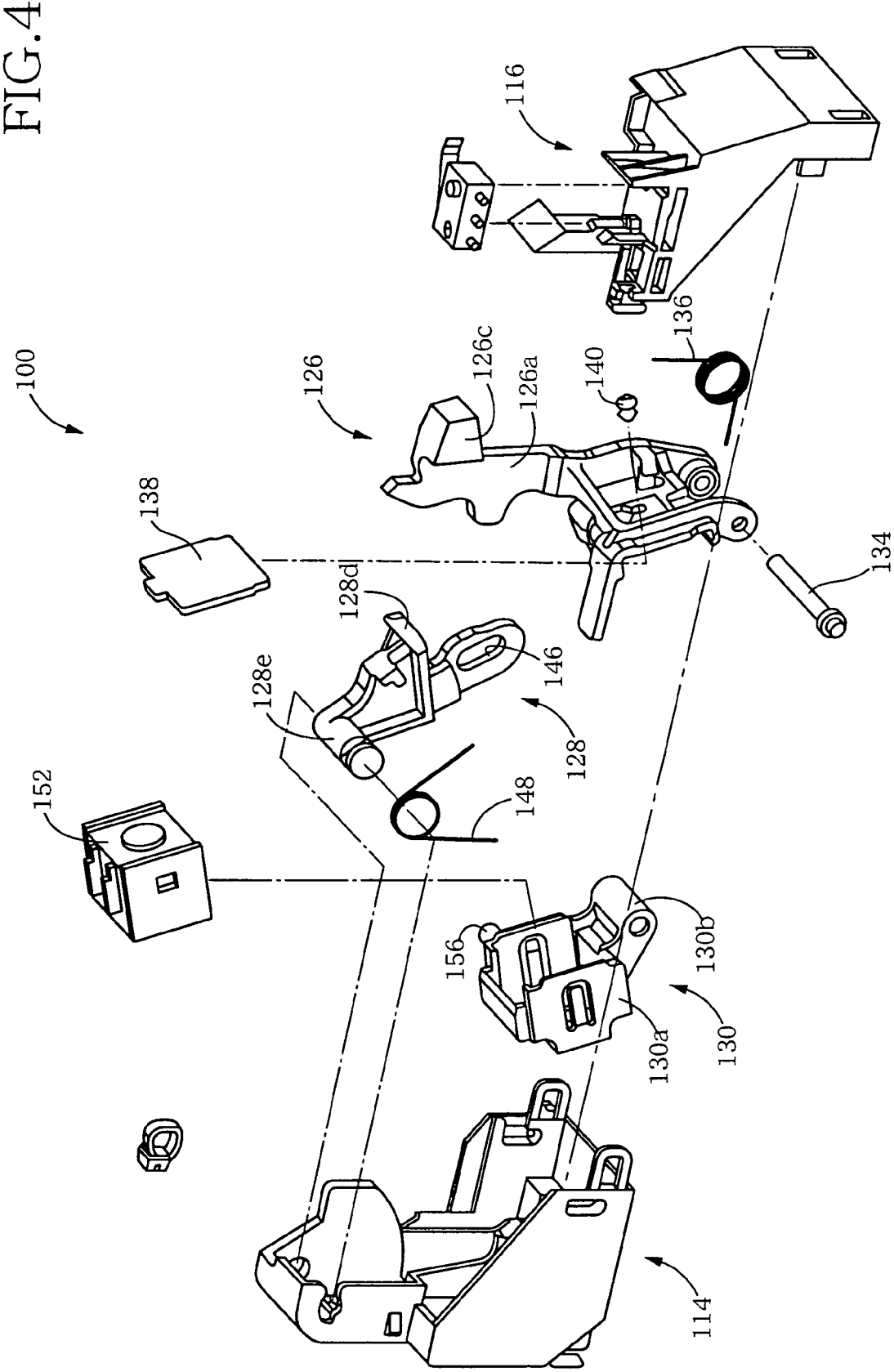
FIG. 4 is an exploded perspective view showing a vehicular shift lock device constructed according to a second embodiment of this invention.
Figure 5:
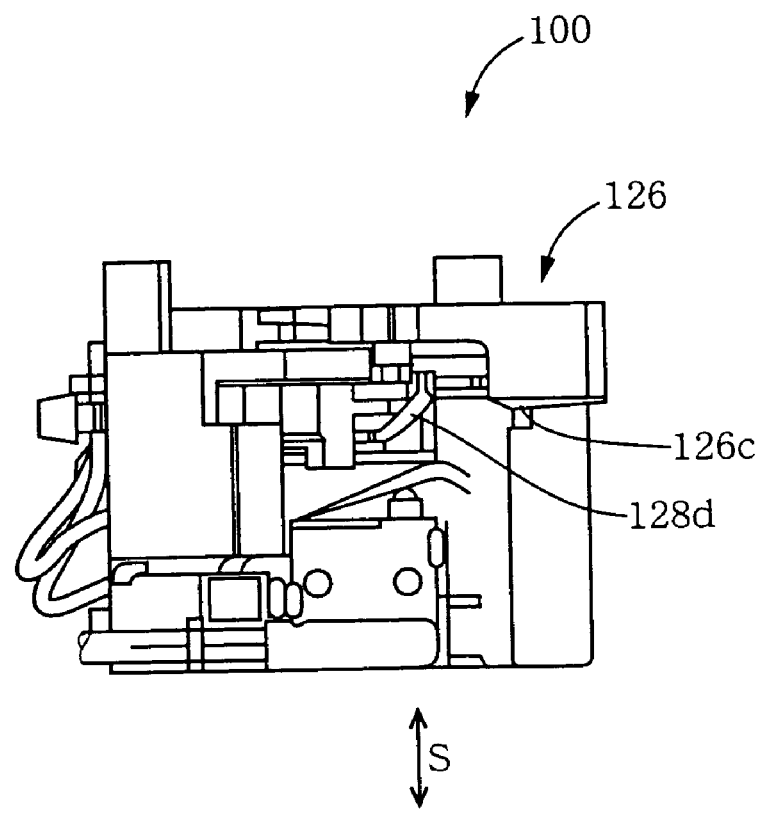
FIG. 5 is a plan view of the vehicular shift lock device of the second embodiment.

Referring to FIGS. 4 and 5, there will be described a vehicular shift lock device 100 constructed according to a second embodiment of the present invention. As shown in the exploded perspective view of FIG. 4, the shift lock device 100 includes a stopper link 126, a cam link 128, a solenoid link 130, a return spring 136, a yoke 138, a rubber cushion 140, a torsion spring 148 and a solenoid 152, which respectively correspond to the stopper link 26, cam link 28, solenoid link 30, return spring 36, yoke 38, rubber cushion 40, torsion spring 48 and solenoid 52 of the shift lock device 10 of the first embodiment. The stopper link 126 functions as the stopper member, the cam link 128 functions as the first linkage device, while the solenoid link 130 functions as the second linkage device. Further, the return spring 136 functions as the first biasing member, and the torsion spring 148 functions as the second biasing member. The stopper link 126, cam link 128, solenoid link 130, yoke 138, rubber cushion 140, torsion spring 148 and solenoid 152 are accommodated in a housing constituted by a casing 114 and a covering 116.

A first support shaft 134 serving as the first axis is supported at its opposite ends by the casing 114, and extends through a lower end portion of the stopper link 126, such that the stopper link 126 is pivotable about the first axis in the form of the first support shaft 134. The stopper link 126 includes an upper end portion having a stopper surface 126 which is substantially parallel to a direction of pivoting of the stopper link 126 about the first axis. The stopper link 126 further includes a spring-seat portion (not shown) extending from one (not shown) of the opposite surfaces of a long plate portion 126a such that the spring-seat portion is perpendicular to that surface. The return spring 136 in the form of a torsion spring is held in engagement at its one end with the spring-seat portion, for biasing the stopper link 126 in the clockwise direction (as seen in FIG. 4) toward its stopping position in which a lateral pivotal movement of the shift lever (not shown) from the parking position P is prevented by the stopper surface 126c.

The cam link 128 has, at its upper end portion, an integrally formed second support shaft portion 128e which corresponds to the second support shaft 44 and which functions as the second axis. This second support shaft portion 128e is supported by the casing 114 such that the first linkage device in the form of the cam link 128 is pivotable about the second support shaft portion 128e. The cam link 128 further has a cam surface 128d, and has an elongate hole 146 formed in its lower end portion. As shown in the plan view of FIG. 5 of the shift lock device 100, the cam surface 128d is inclined such that the inclined cam surface 128d intersects a direction (indicated by arrow-headed line S) of the lateral pivotal movement of the manually operable member in the form of the shift lever. The torsion spring 148 biases the cam link 128 in the counterclockwise direction as seen in FIG. 4, so that the cam link 128 is normally held in its original position under the biasing action of the torsion spring 148.

The solenoid link 130 includes a casing portion 130a of box construction, and a leg portion 130b extending from the lower surface of the casing portion 130a. The first support shaft 134 extends through a distal part of the leg portion 130. The casing portion 130a has a cylindrical pin 156 extending through the elongate hole 146 of the cam link 128.

When the shift lever is laterally pivoted from the parking position P, the cam link 128 is pivoted in the clockwise direction as seen in FIG. 4 about the second support shaft portion 128e, as a result of abutting contact of the shift lever with the cam surface 128d of the cam link 128. At the same time, the solenoid link 130 connected to the cam link 128 through the mutually engaging elongate hole 146 and pin 156 is pivoted in the counterclockwise direction as seen in FIG. 4, If the solenoid 152 is in the de-energized state upon the lateral pivotal movement of the shift lever, the stopper link 126 remains in its stopping position in which the stopper surface 126c prevents a further lateral movement of the shift lever, so that the shift lock device 100 is placed in its locking state.

If the solenoid 152 is in the energized state upon the lateral movement of the shift lever, the yoke 138 fixed to the stopper link 126 is attracted to the solenoid 152, so that the stopper link 126 is pivoted counterclockwise together with the solenoid link 130, whereby the stopper link 126 is brought into its non-stopping position in which the further lateral movement of the shift lever is permitted, with the stopper surface 126c being spaced from a path of the lateral movement of the shift lever.

In the shift lock device 100 of the second embodiment, too, the stopper link 126, cam link 128 and solenoid link 130 which are moved by the lateral pivotal movement of the shift lever to place the shift lock device 100 in the unlocking state are all arranged to be pivotally moved rather than linearly moved, making it possible to easily amplify the operating stroke of the shift lever, thereby reducing the required operating stroke of the shift lever.

While the preferred embodiments have been described in detail by reference to the drawings, it is to be understood that the present invention may be otherwise embodied.

In the illustrated first embodiment, the shift lock devices 10, 100 in the first and second embodiments are provided for the shifting device of the gate type wherein the shift lever 12 functions as the manually operable member operable to place the shift lock device 10, 100 in its unlocking state. However, the shift lock device according to the present invention is equally applicable to a shifting device having a detent knob which functions as the manually operable member.

In the illustrated embodiments, the torsion spring 48, 148 is used as the second biasing member, a coil spring may be used as the second biasing member. The second biasing member may be a plate spring, a rubber member, a pneumatic spring, or any other biasing means.

Figure 6:
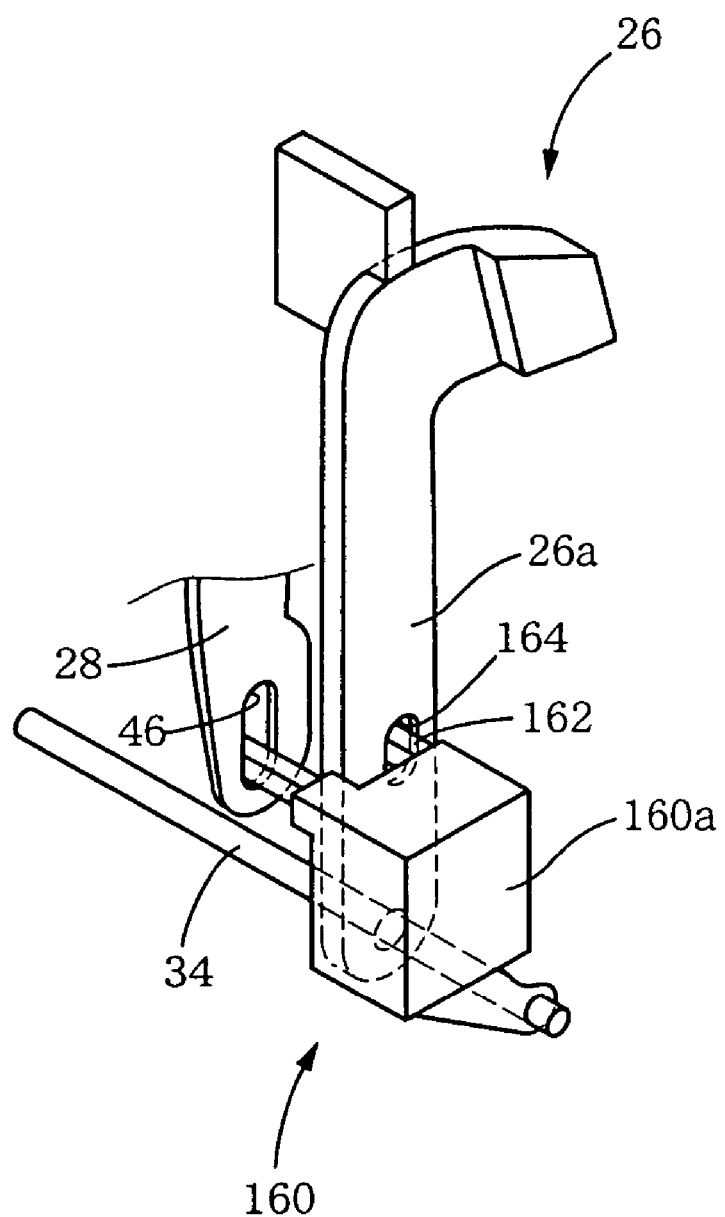
FIG. 6 is a view showing an example of a second interlocking device of mechanical type mechanically connectable to a first interlocking device in the form of a stopper link.

In the illustrated embodiments, the solenoid link 30, 130 functioning as the second linkage device is connectable to the stopper link 26, 126 by an electromagnetic force generated by the solenoid 52, 152 to attract the yoke 38, 138. However, the second linkage device may be mechanically connectable to the stopper link 26, 126. An example of a mechanism arranged to connect the second linkage device and the stopper member is shown in FIG. 6. A shift lock device incorporating this mechanism according to a third embodiment includes a second linkage device 160 which has a main body portion 160a accommodating an actuator (not shown). The shift lock device includes an engaging pin 162 which is axially movable by the actuator in a direction parallel to the first support shaft 34, between an advanced position and a retracted position. The stopper link 26 of this shift lock device has a through-hole 164 formed in its long plate portion 26a. In the advanced position of the pin 162, the pin 162 is held in engagement with the through-hole 164, so that the second linkage device 160 is placed in its connected state in which the second linkage device 160 and the stopper member in the form of the stopper link 26 are connected to each other. The actuator may be any one of various types such as an electromagnetic type, a pneumatic type, a hydraulic type and a gear type.

It is to be understood that the present invention is not limited to the details of the preferred embodiments which have been described above for illustrative purpose only, but may be embodied with various other changes, modifications and improvements which may occur to those skilled in the art, without departing from the spirit and scope of the present invention defined in the following claims.

What is claimed is:

1. A vehicular shift lock device operable between a locking state for inhibiting a movement of a shift lever and an unlocking state for permitting the movement of the shift lever, comprising:

a stopper member which is pivotably mounted such that the stopper member pivots between a stopping position and a non-stopping position, wherein in the stopping position the stopper member restricts a movement of a manually operable member operable, and in said non-stopping position the stopper member does not restrict the movement of the manually operable member;

a first biasing member which biases said stopper member toward said stopping position;

a first linkage device which is pivotably mounted for movement between an original position and an unlocking position, and wherein the first linkage device is moved from said original position to said unlocking position by movement of said manually operable member with said manually operable member engaging said first linkage device and moving said first linkage device from said original position to said unlocking position;

a second biasing member which biases said first linkage device toward said original position; and a second linkage device which is pivotably mounted, and wherein said second linkage device is operatively connected to said first linkage device such that said second linkage device is pivoted from a first position to a second position when said first linkage device is moved from said original position to said unlocking position, and further wherein said second linkage device includes at least part of an actuator device, wherein said actuator device operates between the second linkage device and the stopper member, and further wherein the actuator device is operable between a locking state and an unlocking state when said second linkage device is in said second position, such that:

(a) when said second linkage device is in said second position and said actuator device is in said unlocking state, said stopper member is in said non-stopping position; and (b) when said second linkage device is in said second position and said actuator device is in said locking state, said stopper member is in said stopping position.

2. The vehicular shift lock device according to claim 1, wherein said manually operable member is said shift lever and wherein said shift lever is movably mounted for movement to and from a parking position, and wherein said stopper member prevents movement of the shift lever from said parking position when said stopper member is in said stopping position, and further wherein said stopper member permits movement of the shift lever from said parking position when said stopper member is in said non-stopping position.

3. The vehicular shift lock device according to claim 1, wherein said stopper member and said second linkage device pivot about a common axis.

4. The vehicular shift lock device according to claim 1, further comprising a stationary stopper plate, and wherein said stopper member is held in abutting contact with said stationary stopper plate under a biasing action of said first biasing member when said first linkage device is in said original position, and further wherein said stopper member is held in said stopping position when said first linkage device is in said original position.

5. The vehicular shift lock device according to claim 1, wherein said first linkage device includes a cam surface which is engaged by said manually operable member during movement of the first linkage device from said original position to said unlocking position.

6. The vehicular shift lock device according to claim 5, wherein said first linkage device further includes an elongate hole, and said second linkage device includes a pin engaging said elongate hole, and wherein the second linkage device is pivoted to said second position through engagement of said pin with said elongate hole when said first linkage device is pivoted to said unlocking position.

7. The vehicular shift lock device according to claim 1, wherein said actuator device comprises an electrically controlled actuator provided on said second linkage device.

8. The vehicular shift lock device according to claim 7, wherein said stopper member includes a yoke fixed thereto, and said electrically controlled actuator includes a solenoid which attracts said yoke in an energized state.

9. The vehicular shift lock device according to claim 1, wherein said actuator device includes a solenoid which is mounted on the second linkage device and which pivotably moves with movement of said second linkage device.

10. The vehicular shift lock device according to claim 1, wherein said first biasing member includes a compression coil spring.

11. The vehicular shift lock device according to claim 1, wherein said first biasing member includes a torsion spring.

12. The vehicular shift lock device according to claim 1, wherein said second biasing member includes a torsion spring.

13. The vehicular shift lock device according to claim 1, wherein said stopper member is movable by the actuator device between the stopping and non-stopping positions when said second linkage device is in said second position, such that when said second linkage is in said second position and said actuator is changed from said unlocking state to said locking state, said stopper member is moved by said actuator device in opposition to the first biasing member from said non-stopping position to said stopping position.

14. The vehicular shift lock device according to claim 1, wherein said first biasing member holds said stopper member in said stopping position when said second linkage device is in said first position regardless of the state of the actuator device.

15. A vehicular shift lock comprising:

a manually operable member;

a pivotably mounted stopper member which pivots between a stopping position and a non-stopping position, wherein in said stopping position said pivotably mounted stopper member restricts a movement of the manually operable member, and wherein in said non-stopping position said pivotably mounted stopper member permits the movement of the manually operable member;

a pivotably mounted first linkage device which pivots between an original position and an unlocking position, and wherein said pivotably mounted first linkage device is pivoted from said original position to said unlocking position by movement of said manually operable member;

a pivotably mounted second linkage device which is operatively connected to said pivotably mounted first linkage device such that when said first linkage device is pivoted from said original position to said unlocking position said pivotably mounted second linkage device is pivoted from a first position to a second position; and an actuator device, wherein at least part of said actuator device is mounted on one of said pivotably mounted second linkage device or said pivotably mounted stopper member, and wherein said actuator device controls relative positioning between the pivotably mounted second linkage device and the pivotably mounted stopper member such that:

(a) when said pivotably mounted second linkage device is in said second position and said actuator device is in an unlocking state, said pivotably mounted stopper member is in said non-stopping position, and (b) when said pivotably mounted second linkage device is in said second position and said actuator device is in a locking state, said pivotably mounted stopper member is in said stopping position.

16. The vehicular shift lock device according to claim 15, wherein one of said pivotably mounted stopper member and said pivotably mounted second linkage device has an engaging hole, and the other of said pivotably mounted stopper member and said pivotably mounted second linkage device includes said actuator device, and wherein said actuator device moves an engaging pin into and out of engagement with said engaging hole.

17. The vehicular shift lock device according to claim 16, wherein said pivotably mounted stopper member has said engaging hole, and said pivotably mounted second linkage device includes said engaging pin and said actuator device.

18. The vehicular shift lock of claim 15, wherein said actuator devices pivots the pivotably mounted stopper member relative to the pivotably mounted second linkage device, such that when said pivotably mounted second linkage device is in said second position and the actuator device is changed from the unlocking state to the locking state, the pivotably mounted stopper member is pivoted from the non-stopping position to the stopping position.

19. The vehicular shift lock of claim 18, further including a first biasing member which biases said pivotably mounted stopper member toward said stopping position, and wherein said actuator device operates in opposition to the first biasing member in moving the pivotably mounted stopper member from the stopping position to the non-stopping position.

20. The vehicular shift lock of claim 19, wherein said pivotably mounted stopper member is held in said stopping position when said pivotably mounted second linkage device is in said first position.

21. The vehicular shift lock of claim 20, further including a second biasing member which biases said pivotably mounted first linkage device toward said original position.

22. The vehicular shift lock of claim 21, wherein said actuator device includes an electronically controlled actuator which is mounted on and pivots with one of said pivotably mounted second linkage device or said pivotably mounted stopper member.

23. The vehicular shift lock of claim 15, wherein said pivotably mounted stopper member is held in said stopping position when said pivotably mounted second linkage device is in said first position.

24. The vehicular shift lock of claim 15, wherein said actuator device includes an electronically controlled actuator which is mounted on and pivots with one of said pivotably mounted second linkage device or said pivotably mounted stopper member.

25. The vehicular shift lock of claim 15, wherein said pivotably mounted stopper member is held in the stopping position regardless of the state of the actuator device when the pivotably mounted second linkage device is in the first position.

26. The vehicular shift lock of claim 15, wherein the actuator device operates between the pivotably mounted second linkage device and the pivotably mounted stopper member with the actuator device operatively coupled to both said pivotably mounted second linkage device and the pivotably mounted stopper member to change a relative position of the pivotably mounted stopper member with respect to the pivotably mounted second linkage device.

27. The vehicular shift lock of claim 26, wherein said actuator device includes a solenoid which is mounted on and which pivots with one of said pivotably mounted second linkage device and said pivotably mounted stopper member.

* * * * *